(12) United States Patent
Gomez

(10) Patent No.: US 9,393,520 B2
(45) Date of Patent: Jul. 19, 2016

(54) SYSTEM AND METHOD FOR CREATING AND MAINTAINING LIQUID BUNKER AND REDUCING SULFUR CONTAMINANTS

(71) Applicant: Luis Gomez, Hollywood, FL (US)

(72) Inventor: Luis Gomez, Hollywood, FL (US)

( * ) Notice: Subject to any disclaimer, the term of this patent is extended or adjusted under 35 U.S.C. 154(b) by 0 days.

(21) Appl. No.: 14/660,457

(22) Filed: Mar. 17, 2015

(65) Prior Publication Data

US 2015/0273429 A1    Oct. 1, 2015

Related U.S. Application Data

(60) Provisional application No. 61/970,158, filed on Mar. 25, 2014.

(51) Int. Cl.
*B01J 19/08* (2006.01)
*B01D 53/86* (2006.01)
*C10G 32/00* (2006.01)

(52) U.S. Cl.
CPC ............ *B01D 53/8603* (2013.01); *C10G 32/00* (2013.01)

(58) Field of Classification Search
CPC .......................... B01D 53/8603; C10G 32/00
See application file for complete search history.

(56) References Cited

U.S. PATENT DOCUMENTS 6,712,050 B1    3/2004    Gomez

*Primary Examiner* — Kishor Mayekar
(74) *Attorney, Agent, or Firm* — Robert C. Kain, Jr.

(57) ABSTRACT

A method for reducing sulfur and lowering viscosity in bunker oil by the steps of passing bunker oil over a core that ionizes the bunker oil with an electrostatic charge. The core consists of a metal bar being made of an alloy comprising, by weight, 40-70% copper, 10-32% nickel, 15-40% zinc, 2-20% tin and 0.05-10% silver. The metal bar of the core comprises a plurality of grooves, which allows the bunker oil to be agitated as it comes in contact with the core, activating an electrostatic charge. The electrostatic charge of the core creates a magnetic catalytic reaction that causes: (1) a molecular separation in molecular chains within the bunker oil thereby lowering the viscosity of the bunker oil and (2) sulfur to merge with metals and create metal sulfides in the bunker oil thereby reducing the sulfur in the bunker oil.

15 Claims, 11 Drawing Sheets

Molecular Fuel Chain before treatment

Molecular Fuel Chain after treatment

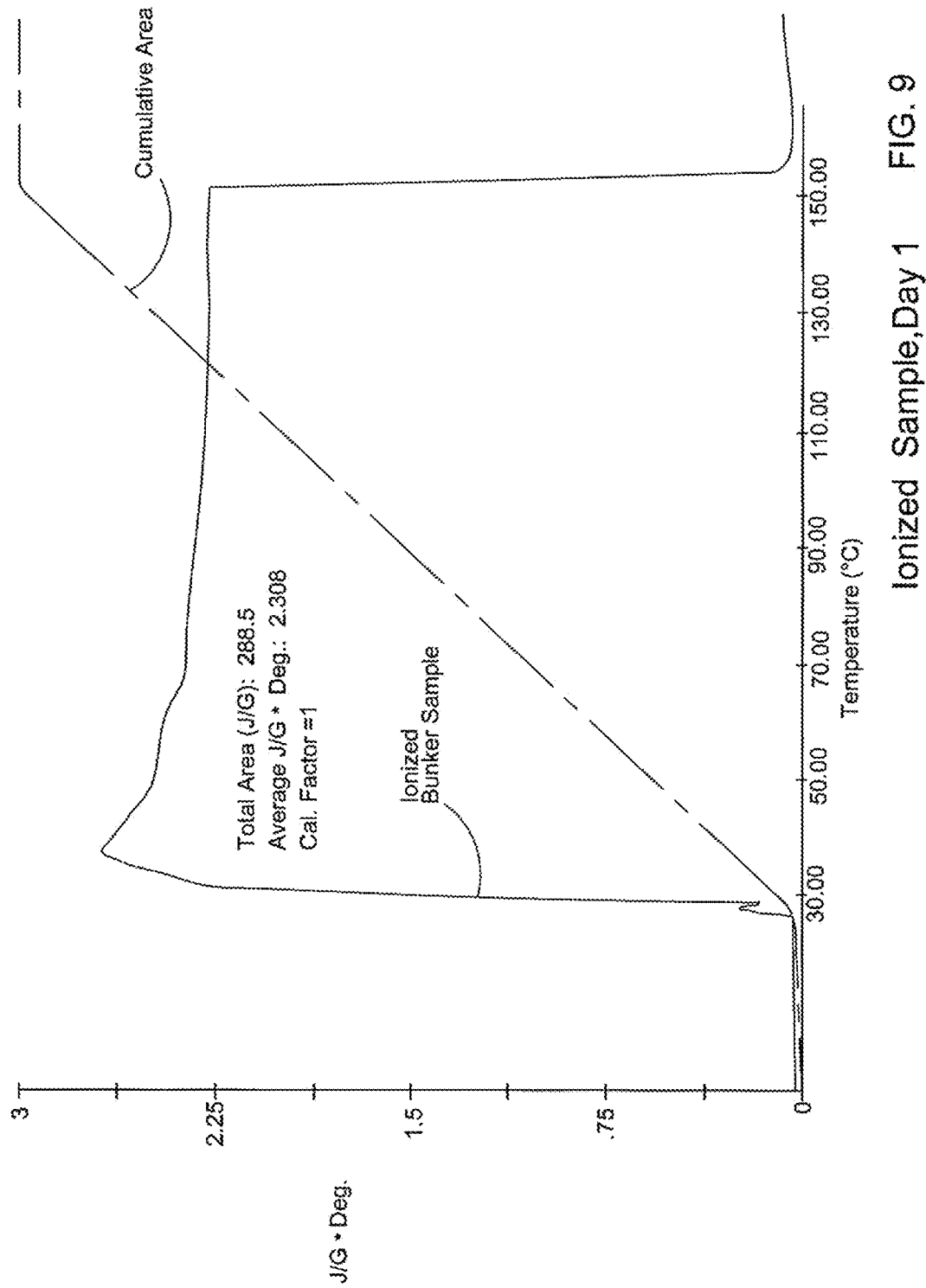

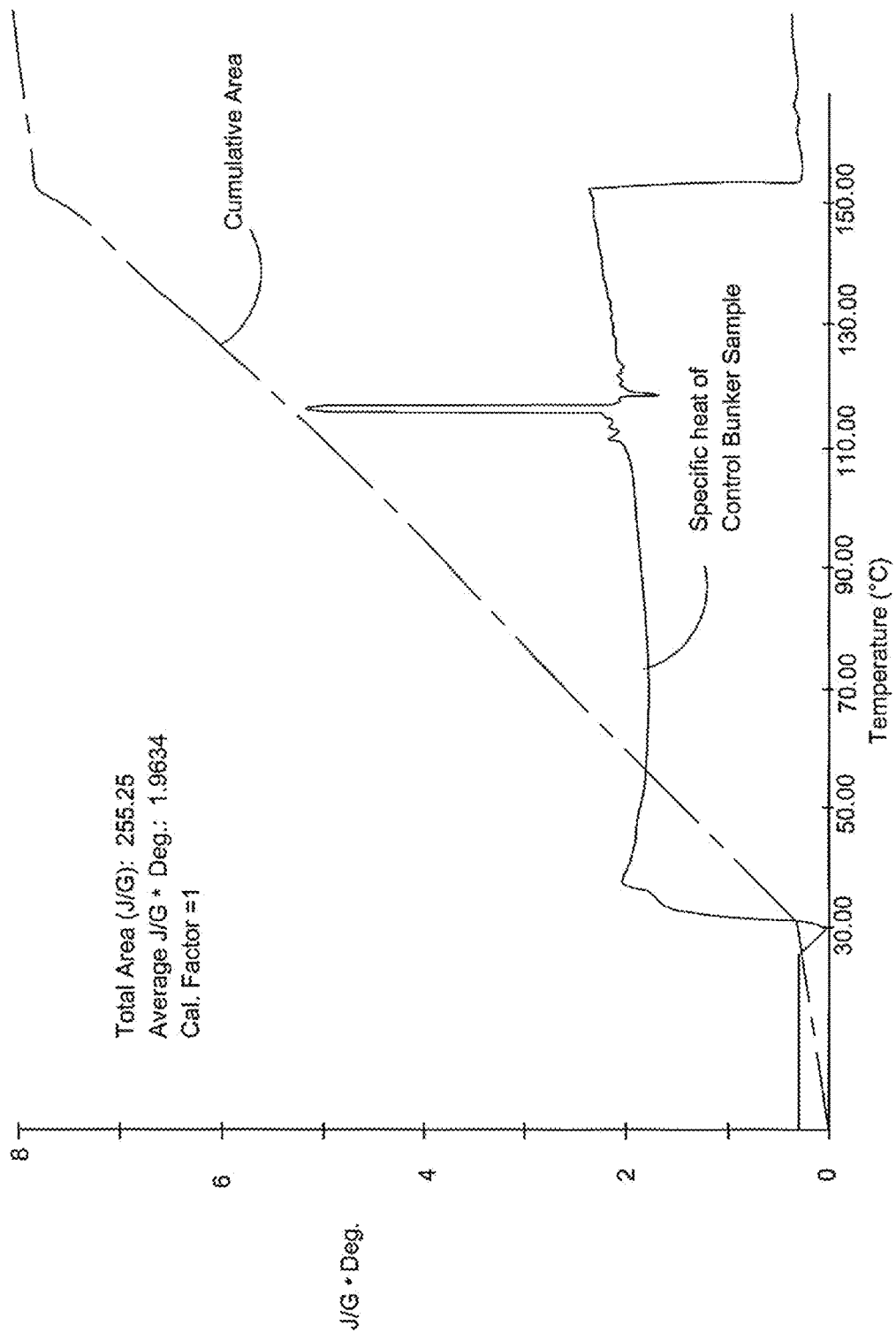

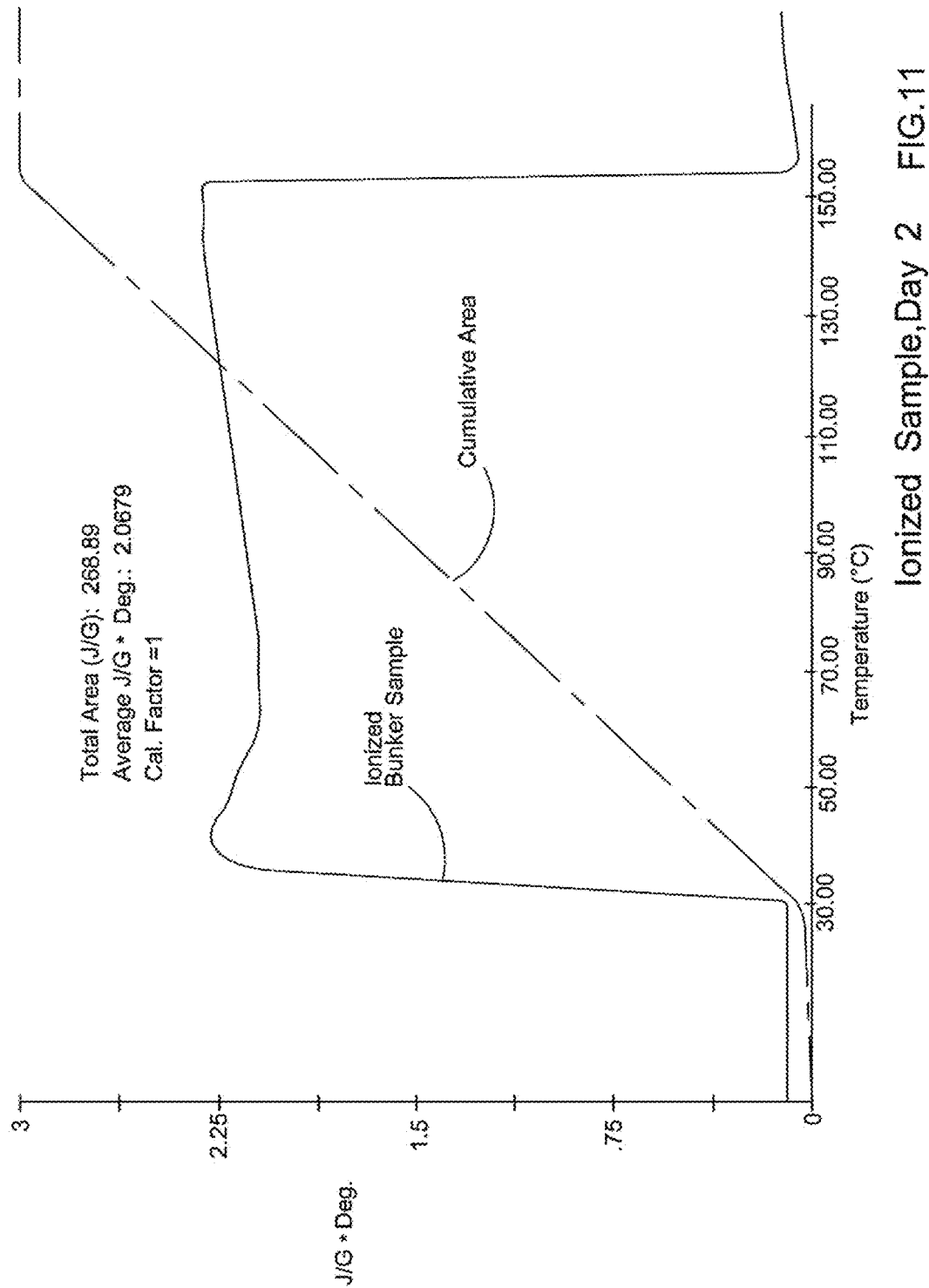

SYSTEM AND METHOD FOR CREATING AND MAINTAINING LIQUID BUNKER AND REDUCING SULFUR CONTAMINANTS

This is a regular patent application based upon provisional patent application Ser. No. 61/970,158, filed Mar. 25, 2014 titled System and Method for Creating and Maintaining Liquid Bunker and Reducing Sulfur Contaminants.

The present invention relates to a method of treating bunker residual oil such that (a) the bunker has a lower viscosity at a given temperature and (b) sulfur contaminants are reduced. The lower viscosity allows the bunker oil to be maintained in a liquid state. This eliminates the need to heat the bunker oil in order to pump and transport it.

BACKGROUND OF THE INVENTION

Research has been conducted to address the environmental issues of cleaner engine exhaust and reduction of sulfur and contaminants in fossil fuels. Bunker oil is a high viscosity residual oil, left over after distillation of gasoline and diesel. One aspect of the present invention is to avoid the present practice of heating bunker oil from the time the oil is pumped from its source until it is used. The present invention liquefies bunker oil without heating or chemicals and substantially reducing the major contaminants found in bunker fuel oil, namely, sulfur.

Since 2014, the shipping industry is facing challenges to meet the strong regulations regarding low sulfur emissions for ships. Bunker oil is a waste product of traditional fuel oil that is too thick for vehicles and small ships to burn efficiently. Bunker oil has a relatively high sulfur content. Bunker is a more economical power source for large ships with medium and slow speed diesel engines and power plants.

Bunker fuel oil is a high-viscosity residual oil which is typically blended with lighter fuel. Bunker oil requires pre-heating to 220° F.-260° F. (104° C.-127° C.) for pumping or transport from source to burner. The term "residual" refers to material remaining after the more valuable cuts of crude oil have been boiled off or distilled away. The residue may contain various undesirable impurities including two percent water and one-half percent mineral soil. This fuel is sometimes called "residual fuel oil" ("RFO"), by the Navy specification of Bunker C, or by the Pacific Specification of PS-400.

Bunker fuel degrades slower than standard fuel oil and produces a mixture of sulfur dioxide, carbon dioxide, and other pollutants when burned. Due to these ill-effects, bunker fuel oil is replaced by gas-oil in a number of instances. The bunker oil market is expected to experience a downturn due to strict regulations imposed by governments of most countries for limiting the use of bunker fuel oil there by increasing the cost of these companies to do business.

Bunker fuel is a type of liquid fuel which is fractionally distilled from crude oil. When crude oil is refined, the lighter petrochemical fractions (gasoline, kerosene, diesel, etc.) are removed by distillation. The heavier materials in crude petroleum are not distilled, mainly because the boiling points are too high to conveniently recover the heavier distillates. These heavier materials (asphaltenes, waxes, very large molecules, etc.) carry through refining and become residual oil (or residual). During various operations in the refinery, principally heating at high temperatures, rearrangement of molecules may take place forming even larger molecular materials that have still higher boiling points. These materials also become part of the residual. Finally, contaminants in the crude that are not distilled from the crude and will be carried over to the residual. This includes any salts (chemical elements that are typically soluble in water), sediment (oil-wetted solids), and the heavy organic molecules from various sources. Just as salt water leaves a residue of salt behind when it evaporates, so too does the refining process leave solids behind when the lighter materials are removed.

Before selling residual as bunker fuel, a refiner will very often dilute it to meet various sales specifications for trace metals, sulfur and/or viscosity. This process costs approximately $40.00 USD/barrel. An average refinery will produce 500 thousand to 1.4 million barrels of bunker per day.

An opportunity arises if one can control sulfur in bunker oil and/or decrease the cost of handling and transport of bunker oil thereby creating a paradigm shift in the oil refinery industry. Bunker oil costs are rising faster than crude oil prices. In the 2014 marketplace, shipping companies were focused on reducing their bunker oil costs. Freight prices have fallen while bunker oil costs have risen, at times exceeding 50 percent of total operational costs, and bunker oil prices have become "extremely volatile" as crude prices fluctuate. Bunker oil prices have risen more than crude oil prices because the chemical industry has moved refinery capacity away from bunker production to fill a demand for high-distillate products.

Environmental regulations, including a growing number of Emissions Control Areas ("ECA"s) created by the International Maritime Organization ("IMO"), have forced companies to meet the requirements of 0.1% to switch to the use of more expensive low-sulfur fuel, exhaust gas scrubbing and liquefied natural gas (LNG). Also the IMO requires that all vessels have a Ship Energy Efficiency Management Plan by Jan. 1, 2015 which has increased focus on fuel management. Another factor in the cost of fuel oil is company management of procurement, consumption, and efficiency measures. Performance varies widely. For example, one study found that bunker consumption among participants fluctuated by as much as 30% within any given vessel class. To improve fuel efficiency, companies must move beyond slow steaming and improved bunker oil procurement methods and develop teams and disciplined methods to address the issue. A recent Bloomberg analysis predicted that fuel oil demand will hit its highest point ever over the next 2 years, putting more pressure on shipping companies.

TABLE I

| | | | | Fuel Oil Specifications | | | | |
|---|---|---|---|---|---|---|---|---|
| | | | | Cutoffs | | | | |
| Quality feature | Unit | | LU L-I | LU L-II | LU S-I | LU S-II | LU T-I | LU T-II | Testing methods[a)] |
| Flash point | ° C. | above | 60.0 | | 70.0 | | 80.0 | | HR EN ISO 2719 ASTM D 93 |
| Kinematic viscosity: | $mm^2/s$ | | 6.0-20.0 2.0-6.0 | | — 6.0-26.0 | | — 26.0-45.0 | | HR EN ISO 3104 ASTM D 445 |

TABLE I-continued

Fuel Oil Specifications

| Quality feature | Unit | | LU L-I | LU L-II | LU S-I | LU S-II | LU T-I | LU T-II | Testing methods[a)] |
|---|---|---|---|---|---|---|---|---|---|
| at 50° C. | | | | | | | | | ASTM D 7042 |
| at 100° C. | | | | | | | | | |
| Total sulfur content[b)] | % m/m | max | 1.0 | 2.0[1)] | 1.0 | 2.8[1)] | 1.0 | 3.0[1)] | HR EN ISO 8754 HR EN ISO 14596 ASTM D 2622 ASTM D 4294 |
| Water content | % v/v | max | | 0.3 | | 0.5 | | 1.0 | HR ISO 3733 ASTM D 95 |
| Sediment and water content | % v/v | max | | 0.5 | | 1.0 | | 1.5 | HR ISO 3734 ASTM D 1796 |
| Carbon residue content | % m/m | max | | 8 | | 15 | | 18 | HR EN ISO 10370 HR ISO 6615 ASTM D 189 ASTM D 4530 |
| Inferior calorific value | MJ/kg | min | | 41 | | 40 | | 39 | HR ISO 8217 ASTM D 4868 ASTM D 240 |
| Ash content | % m/m | max | | 0.15 | | 0.20 | | 0.20 | HR EN ISO 6245 ASTM D 482 |
| Pour point | ° C. | max | | 30 | | 40 | | 50 | HR ISO 3016 ASTM D 97 |

Table I provides the proscribed limitations on fuel oil. Bunker fuel oil typically falls under the "LU S-I" and "LU S-II" groups. As shown, the kinematic viscosity at 50° C. and at 100° C. is 6.0-26.0. The total sulfur content is between 1.0-2.8. There is a pour point of 40.

TABLE II

Distillate bunker oil specifications

| Quality feature | Unit | | DMX | DMA | DMZ | DMB | Testing methods[a)] |
|---|---|---|---|---|---|---|---|
| Kinematic viscosity: at 40° C.[a)] | mm²/s | min | 1,400 | 2,000 | 3,000 | 2,000 | HR EN ISO 3104 |
| | | max | 5,500 | 6,000 | 6,000 | 11,000 | ASTM D 445 |
| Density at 15° C. | kg/m³ | max | — | 890.0 | 890.0 | 900.0 | HR EN ISO 3675 HR EN ISO 12185 ASTM D 1298 ASTM D 4052 (see 5.5) |
| Cetane index | | min | 45 | 40 | 40 | 35 | HR EN ISO 4264 ASTM D 4737 |
| Total sulfur content[b)] | % m/m | max | 1.00 | 1.00[1)] | 1.50 | 2.00 | HR EN ISO 8754 HR EN ISO 14596 ASTM D 2622 ASTM D 4294 (see 5.7) |
| Flash point | ° C. | min | 43.0 | 60.0 | 60.0 | 60.0 | HR EN ISO 2719 ASTM D 93 (see 5.6) |
| Hydrogen sulfide[c)] | mg/kg | max | 2.00 | 2.00 | 2.00 | 2.00 | IP 570 |
| Acid number[c)] | mg KOH/g | max | 0.5 | 0.5 | 0.5 | 0.5 | ASTM D 664 |
| Total sediment content - hot filtration | % m/m | max | — | — | — | 0.1[e)] | HR ISO 10307-1 ASTM D 4870 IP 375 |
| Oxidative stability | g/cm³ | max | 25 | 25 | 25 | 25[f)] | HR EN ISO 12205 |
| Carbon residue content (10% residue of "% v/v") | % m/m | max | 0.30 | 0.30 | 0.30 | — | HR EN ISO 10370 ASTM D 4530 |
| Carbon residue content | % m/m | max | — | — | — | 0.30 | HR EN ISO 10370 ASTM D 4530 |
| Cloud point | ° C. | max | −16 | — | — | — | HR EN ISO 23015 ASTM D 2500 |
| Pour point (superior)[d)] Winter quality | ° C. | max | −6 | −6 | −6 | 0 | HR ISO 3016 |
| Summer quality | | max | 0 | 0 | 0 | 6 | ASTM D 97 |
| Appearance | | | clear and transparent | | | [e)f)g)] | Visually (see 5.8 and 5.9) |

TABLE II-continued

Distillate bunker oil specifications

| Quality feature | Unit | | DMX | DMA | DMZ | DMB | Testing methods[a)] |
|---|---|---|---|---|---|---|---|
| Water content | % v/v | max | — | — | — | 0.30[e)] | HRN ISO 3733 ASTM D 95 |
| Ash content | % m/m | max | 0.010 | 0.010 | 0.010 | 0.010 | HRN EN ISO 6245 ASTM D 189 |
| Lubricity (wear scar diameter,, wsd °1.4) at 60° C.[h)] | μm | max | 520 | 520 | 520 | 520[g)] | HRN EN ISO 12156-1 |

Table II provides the proscribed distillate bunker oil specifications. This data is provided for reference when comparing the results of the tests performed on the bunker oil treated with the ionizing core of the invention.

OBJECTS OF THE INVENTION

It is an object of the present invention to treat bunker residual oil with a core disposed in a bunker supply line such

TABLE III

Residual bunker oil specifications

| Quality feature | Unit | Cut-off | RMA 10 | RMB 30 | RMD 90 | RME 180 | RMG 180 | RMG 380 | RMG 500 | RMG 700 | RMK 380 | RMK 500 | RMK 700 | Testing methods |
|---|---|---|---|---|---|---|---|---|---|---|---|---|---|---|
| Kinematic viscosity at 40° C.[a)] | mm²/s | min max | 10.0 | 30.0 | 90.0 | 180.0 | 180 | 380 | 500 | 700 | 380 | 500 | 700 | HR EN ISO 3104 ASTM D 445 |
| Density at 15° C. | kg/m³ | max | 920.0 | 960.0 | 975.0 | 991.0 | | 991.0 | | | | 1010.0 | | HR EN ISO 3675 HR EN ISO 12185 ASTM D 1298 ASTM D 4052 (see 5.5) |
| Aromaticity index CCAI | | min | 850 | 860 | 860 | 860 | | 870 | | | | 870 | | Calculated (see 5.15) |
| Total sulfur content[b)] | % m/m | max | | 3.50 | 4.00 | 4.50 | | 4.50 | | | | 4.50 | | HR EN ISO 8754 HR EN ISO 14596 ASTSM D 2622 ASTSM D 4294 (see 5.7) |
| Flash point | ° C. | min | 60.0 | 60.0 | 60.0 | 60.0 | | 60.0 | | | | 60.0 | | HR EN ISO 2719 ASTM D 93 (see 5.6) |
| Hydrogen sulfide[c)] | mg/kg | max | 2.00 | 2.00 | 2.00 | 2.00 | | 2.00 | | | | 2.00 | | IP 570 |
| Acid number[c)] | mg KOH/g | max | 2.50 | 2.50 | 2.50 | 2.50 | | 2.50 | | | | 2.50 | | ASTM D 664 |
| Total sediment content - by aging | % m/m | max | 0.10 | 0.10 | 0.10 | 0.10 | | 0.10 | | | | 0.10 | | HRN ISO 10307-2 (SEE 5.10) |
| Carbon residue content | % m/m | max | 2.50 | 10.00 | 14.00 | 15.00 | | 18.00 | | | | 20.00 | | HR EN ISO 10370 ASTM D 4530 |
| Pour point (superior)[d)] Winter quality Summer quality | ° C. ° C. | max max | 0 6 | 0 6 | 30 30 | 30 30 | | 30 30 | | | | 30 30 | | HRN ISO 3016 ASTM D 97 |
| Water content | % v/v | max | 0.30 | 0.50 | 0.50 | 0.50 | | 0.50 | | | | 0.50 | | HRN ISO 3733 ASTM D 95 |
| Ash content | % m/m | max | 0.040 | 0.070 | 0.070 | 0.070 | | 0.100 | | | | 0.150 | | HRN EN ISO 6245 ASTM D 462 |

Table III provides the proscribed residual bunker oil specifications. This data is provided for reference when comparing the results of the tests performed on the bunker oil treated with the ionizing core of the invention.

that (a) the bunker oil has a lower viscosity at a given temperature and (b) sulfur contaminants are reduced. At a lower viscosity, the bunker oil will maintain a liquid state without the need for heating.

The core being used to treat the bunker oil consists of five different metals in a unique arrangement of tongue grooves, which allows the fuel to be agitated or swirl as it comes in contact with the core, activating the electrostatic charge. The core is in a closed tube, which is directly connected to the fuel supply, preferably at the production site.

It is a further object of the present invention to lower the viscosity of bunker oil so that it is able to maintain a liquid state so it can be produced and transported without heating. It is also an object of the invention to reduce sulfur in bunker oil so that when the bunker oil is used, there is less sulfur pollution of the environment.

SUMMARY OF THE INVENTION

A method for reducing sulfur contaminants and lowering viscosity in bunker oil by passing bunker oil over a core that ionizes the bunker oil with an electrostatic charge. The core consists of a metal bar being made of an alloy comprising, by weight, 40-70% copper, 10-32% nickel, 15-40% zinc, 2-20% tin and 0.05-10% silver. The core is within a casing having an inlet and an outlet at its ends for receiving and discharging the bunker oil to be treated. The core is placed on a bunker oil supply line. The metal bar of the core comprises a plurality of cuts having a concave shape and arranged diagonally along an entire surface of an upper and a lower face of the metal bar of the core to create grooves, which allows the bunker oil to be agitated as it comes in contact with the core, activating the electrostatic charge.

The electrostatic charge of the core creates a magnetic catalytic reaction that causes a molecular separation in molecular chains within the bunker oil thereby lowering the viscosity of the bunker oil. The lower viscosity maintains the bunker oil in the liquid state for pumping and transport. The electrostatic charge of the core creates a magnetic catalytic reaction that causes sulfur contaminants to merge with metals and create metal sulfides in the bunker oil thereby reducing the sulfur in the bunker oil.

A system for reducing sulfur contaminants and maintaining bunker oil in a liquid state by exposing bunker oil to a core that ionizes the bunker oil with an electrostatic charge. The core consists of a metal bar being made of an alloy comprising, by weight, 40-70% copper, 10-32% nickel, 15-40% zinc, 2-20% tin and 0.05-10% silver. The metal bar of the core comprises a plurality of cuts having a concave shape and arranged diagonally along an entire surface of an upper and a lower face of the metal bar of the core to create grooves, which allows the bunker oil to be agitated as it comes in contact with the core, activating the electrostatic charge.

The core is within a casing having an inlet and an outlet at its ends for receiving and discharging the bunker oil to be treated. The bunker oil exiting from the outlet of the casing has a lowered viscosity so that the bunker oil remains in a liquid state at temperatures above 15° C. The bunker oil maintains a liquid state at temperatures in the range of 100° C. to 15° C. The core is placed on a bunker oil supply line so that the bunker oil remains in a liquid state after production. The bunker oil exiting from the outlet of the casing has reduced sulfur contaminants.

BRIEF DESCRIPTION OF THE DRAWINGS

Further objects and advantages of the present invention can be found in the detailed description of the preferred embodiments when taken in conjunction with the accompanying drawings in which:

FIG. 9 is an endothermic graph of the ionized bunker sample on day 1.

FIG. 10 is an endothermic graph of the control bunker sample on day 2.

FIG. 11 is an endothermic graph of the ionized bunker sample on day 2.

DETAILED DESCRIPTION OF THE PREFERRED EMBODIMENTS

The bunker residual oil is treated with a core disposed in a bunker supply line such that (a) the bunker oil has a lower viscosity at a given temperature and (b) sulfur contaminants are reduced. The core is disclosed in U.S. Pat. No. 6,712,050. The core being used to treat the bunker oil consists of five different metals in a unique and patented arrangement of grooves, which allows the fuel to be agitated or swirl as it comes in contact with the core, activating the electrostatic charge. The core is made of an alloy comprising, by weight, 30-60% copper, 10-30% nickel, 15-40% zinc, 5-20% tin and 1-10% silver. The core is in a closed tube, which is directly connected to the fuel supply, preferably at the production site.

The core consists of dissimilar metals in a cylindrical chamber. When oil is passed through the core, a constant magnetic field is created affecting the molecules of the oil. The crude acts as a dielectric, which creates a polarization. The effect blends the hydrocarbons and alkanes. Additionally, the water in the oil usually contains a high amount of salt which is released therefore acts as an excellent conductor of electricity. The combined effect creates a phenomenon of molecular refraction, which creates enough energy to reduce sulfur. When the oil comes out of the core having been subjected to the magnetic field, polarization, and molecular refraction, the crude's molecular geometry and the viscosity have been significantly modified and will remain low even in temperatures below 15° C. In fact, tests have shown treated bunker oil remaining in the liquid state in temperatures at or above 0° C.

Figure 1C:
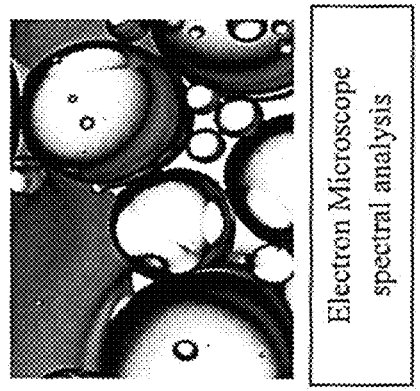
FIG. 1C is an electron microscope spectral analysis of the fuel chain after treatment.
Figure 1B:
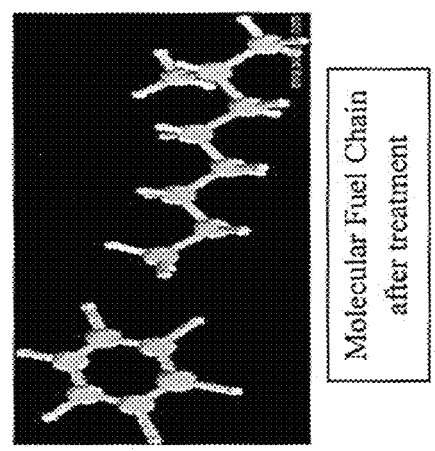
FIG. 1B is the molecular fuel chain after treatment.
Figure 1A:
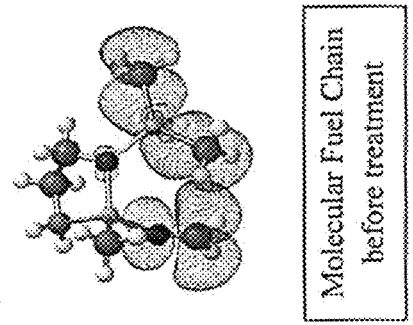
FIG. 1A is the molecular fuel chain before a treatment.

The core disposed in the bunker fuel line does not consume any form of additional energy. As shown in FIGS. 1A, 1B, and 1C as the fuel passes over the core, electrostatically charged molecules in the fuel with the same polarity adheres to the thesis of mutual rejection and thus creates a finer structure of the molecular fuel chain. FIG. 1A depicts the molecular fuel chain before passing over the core, which is herein also called treatment. FIG. 1B depicts the molecular fuel chain after treatment. FIG. 1C is an electron microscope spectral analysis of the fuel after treatment. The output liquid, or ionized liquid, which has a finer structure, can be transported to the consumer, or pumped into the transport vessels without any further treatment or heating, there by revolutionizing the cost structure for creation and transport of fuel oil.

Crude hydrocarbon is a compound of linear, cyclical, aromatic alkanes, some metals and sulfur. The ratio of these components is diverse and there is no general pattern: each deposit is particular in its composition of molecules. The real constant is that the crude is kept flowable, that is to say it has the viscosity that allows it to flow easily in temperatures above 60° C. When lowering the temperature, the intermolecular energy diminishes causing them to contract, inducing with this the increase of viscosity.

As discussed, viscosity is closely connected with the order of the molecules within the liquid and their interaction with the surface of the liquid (surface tension). The effects of a magnetic field on the properties of the liquids have been studied; this branch of physics is known as magnetohydrodynamics. A magnetic field represents or is a manifestation of energy, and if we take into consideration the magnetic nature of the organic molecules (covalent), it is expected that in the proportion of the intensity of the magnetic field the shape of the molecules is altered. Stereoisomerism explains how a compound with the same molecular weight and same atom proportions, can present different physical and chemical properties.

In the case of the core, the magnetic field is generated in a concentric way in the cylindrical core-carrying chamber. This magnetic field is constant and permanent, and affects the "empty" spaces of the organic molecules of the bunker fuel passing through and over and around the core. Furthermore, the crude oil acts as a dielectric member (a material that conducts electric energy poorly) which generates a polarization in it, a fact that prompts a "bending" of the alkanes (cyclical and linear). During this process, encapsulated water with a high salt content is released, and therefore the water release acts as an excellent conductor of electricity. This duality generates a phenomenon of molar refraction, adding enough energy to reduce sulfur (common radical and problematic in crude), and reacts quickly when in contact with polarized water.

When these forces act on the bunker fuel oil liquid (magnetic field, orientation polarization, molecular refraction—the intermolecular forces of the crude before passing through the ionization core-chamber), the fuel is reorganized with "new" intermolecular forces (mainly of the Van der Walls type); the crude has modified its molecular geometry and, in this process, the viscosity of the treated fuel remains low even in temperatures below 15° C. Further, tests have shown treated bunker oil to remain in a liquid state at temperatures around 0° C. Consider that the intensity of the magnetic field (and its collateral effects) prompts the "separation" of radicals. Test evidence indicates that treated fuel has an effect on sulfur content and construct.

Example I

Three fuel oil samples were received: (1) control bunker, (2) ionized bunker sample 1 and (3) ionized bunker sample 2. The three samples were examined with differential scanning calorimetry (hereinafter referred to as "DSC") by using "DSC823e Mettler Toledo" device, the results of which are shown in FIGS. 2 to 7. The basic principle underlying this technique is that when the sample undergoes a physical transformation such as phase transitions, more or less heat will need to flow to it than the reference to maintain both at the same temperature. Whether less or more heat must flow to the sample depends on whether the process is exothermic or endothermic. For example, as a solid sample melts to a liquid it will require more heat flowing to the sample to increase its temperature at the same rate as the reference. This is due to the absorption of heat by the sample as it undergoes the endothermic phase transition from solid to liquid.

Figure 2:
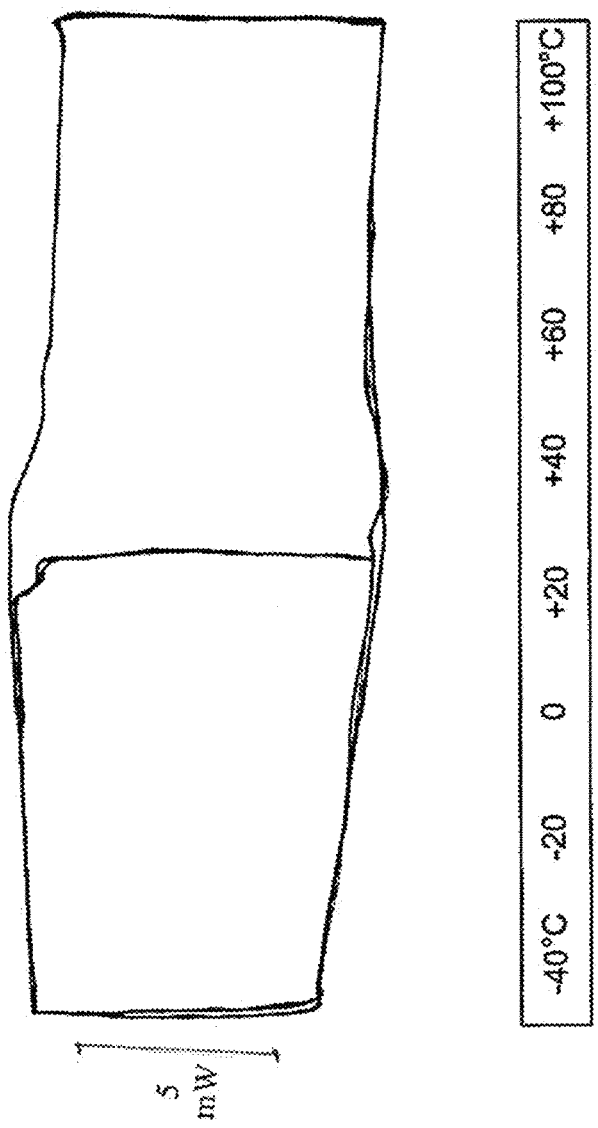
FIG. 2 is the differential scanning calorimetry temperature log of the control bunker sample.
Figure 3:
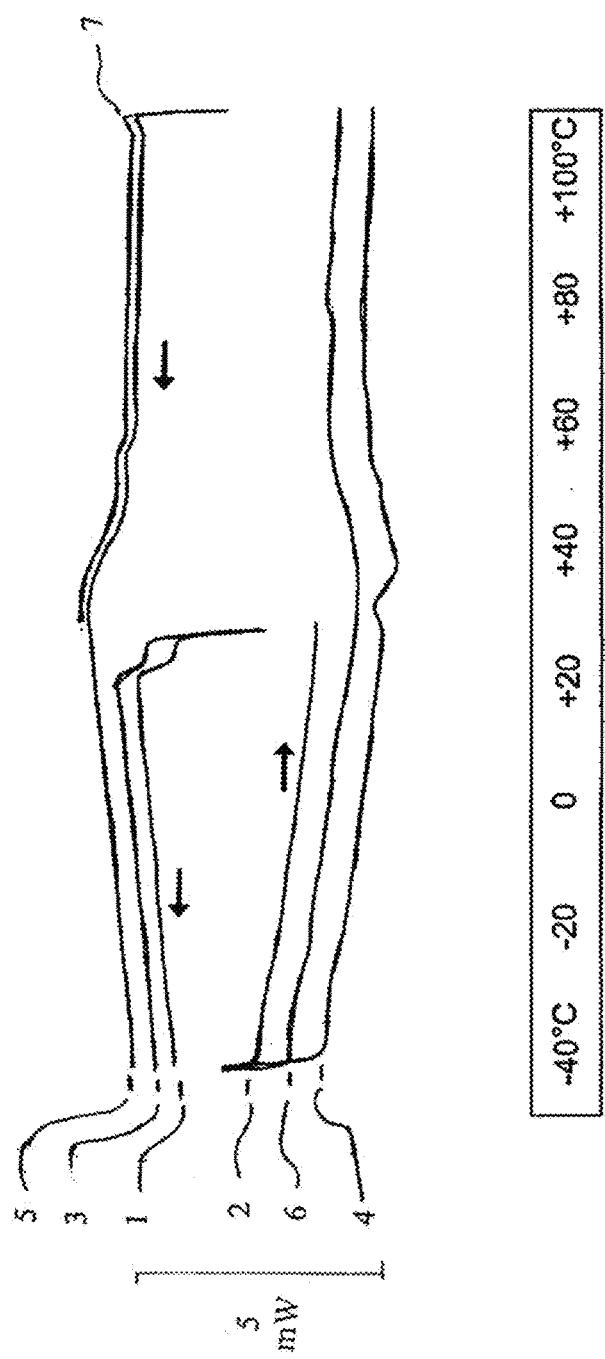
FIG. 3 is the differential scanning calorimetry temperature log of the control bunker sample with marked cycles of cooling and heating.
Figure 4:
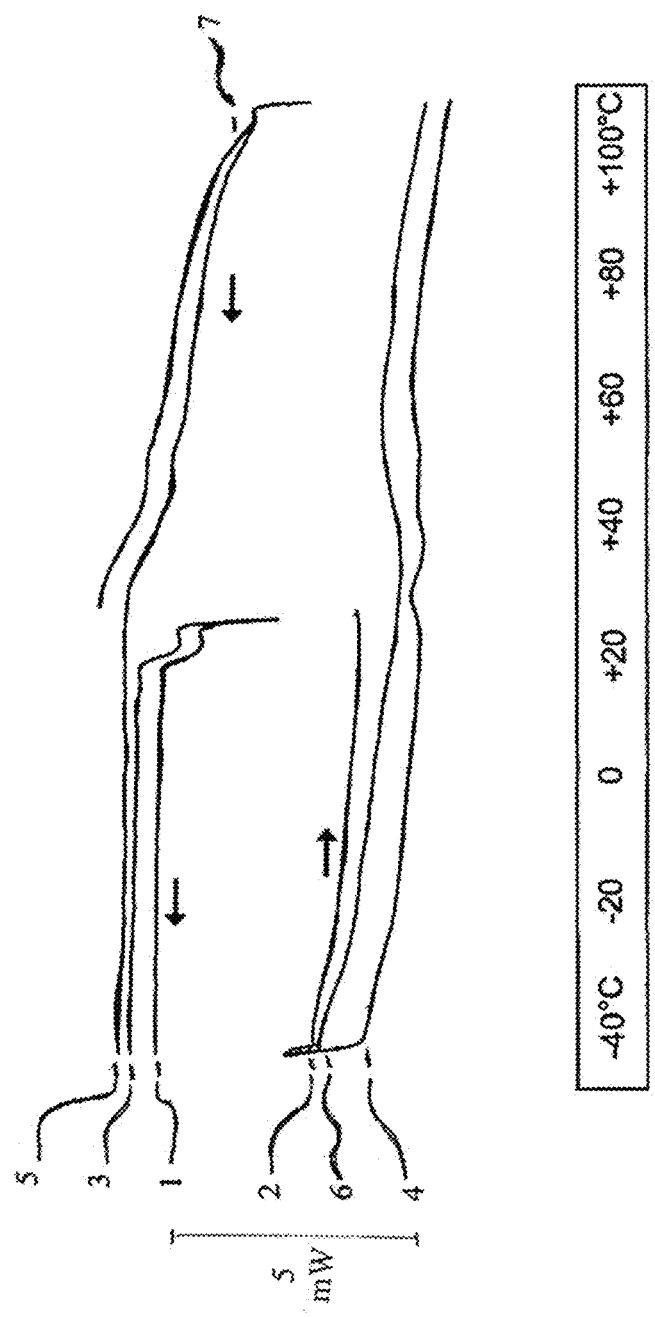
FIG. 4 is the differential scanning calorimetry temperature log of the ionized bunker sample 1 with marked cycles of cooling and heating.
Figure 5:
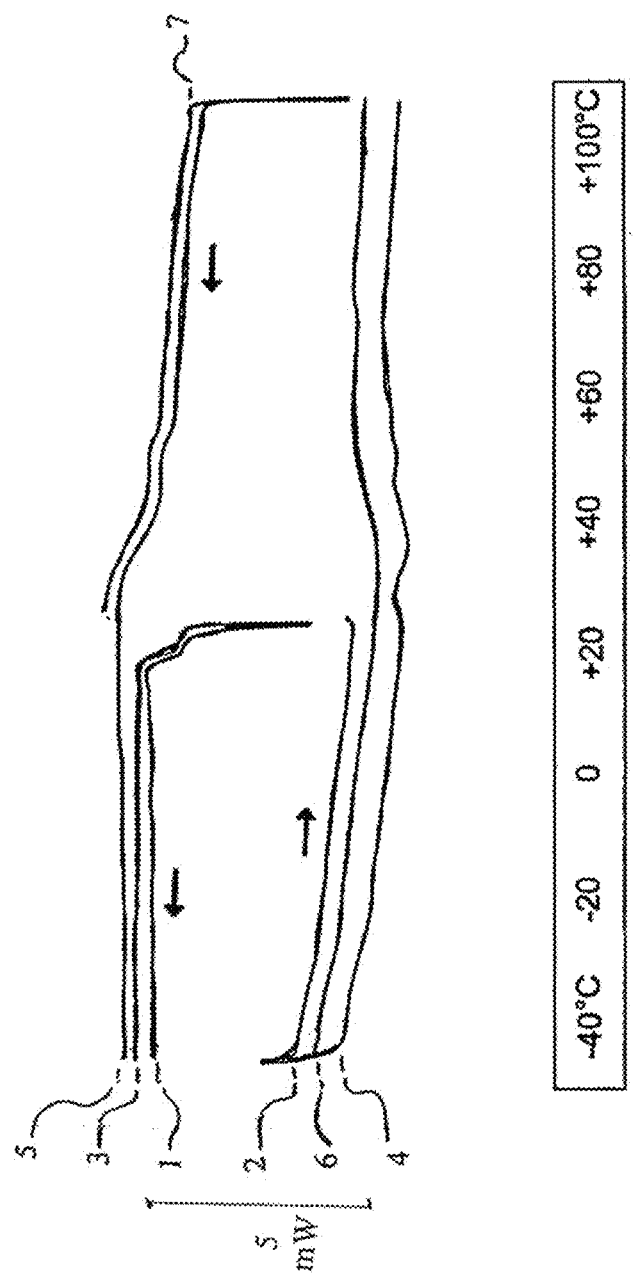
FIG. 5 is the differential scanning calorimetry temperature log of the ionized bunker sample 2 with marked cycles of cooling and heating.

Measurement was conducted in four levels of cooling and three levels of heating with speed of 10° C./min in nitrogen environment: (1) cooling from 25° C. to −40° C., (2) heating from −40° C. to 25° C., (3) cooling from 25° C. to −40° C., (4) heating from −40° C. to 100° C., (5) cooling from 100° C. to −40° C., (6) heating from −40° C. to 100° C., (7) cooling from 100° C. to 25° C. In FIGS. 2-7, the x axis reflects the temperature and the y axis reflects the heat flow or power differential (mW). Example of one complete temperature log, with all measuring cycles, is shown in FIG. 2. FIG. 3 shows a DSC temperature log of control bunker sample with marked cycles of cooling 1, 3, 5 and 7 and heating 2, 4 and 6. FIG. 4 shows a DSC temperature log of ionized bunker sample 1 with marked cycles of cooling 1, 3, 5 and 7 and heating 2, 4 and 6. FIG. 5 shows a DSC temperature log of ionized bunker sample 2 with marked cycles of cooling 1, 3, 5 and 7 and heating 2, 4 and 6.

Figure 6:
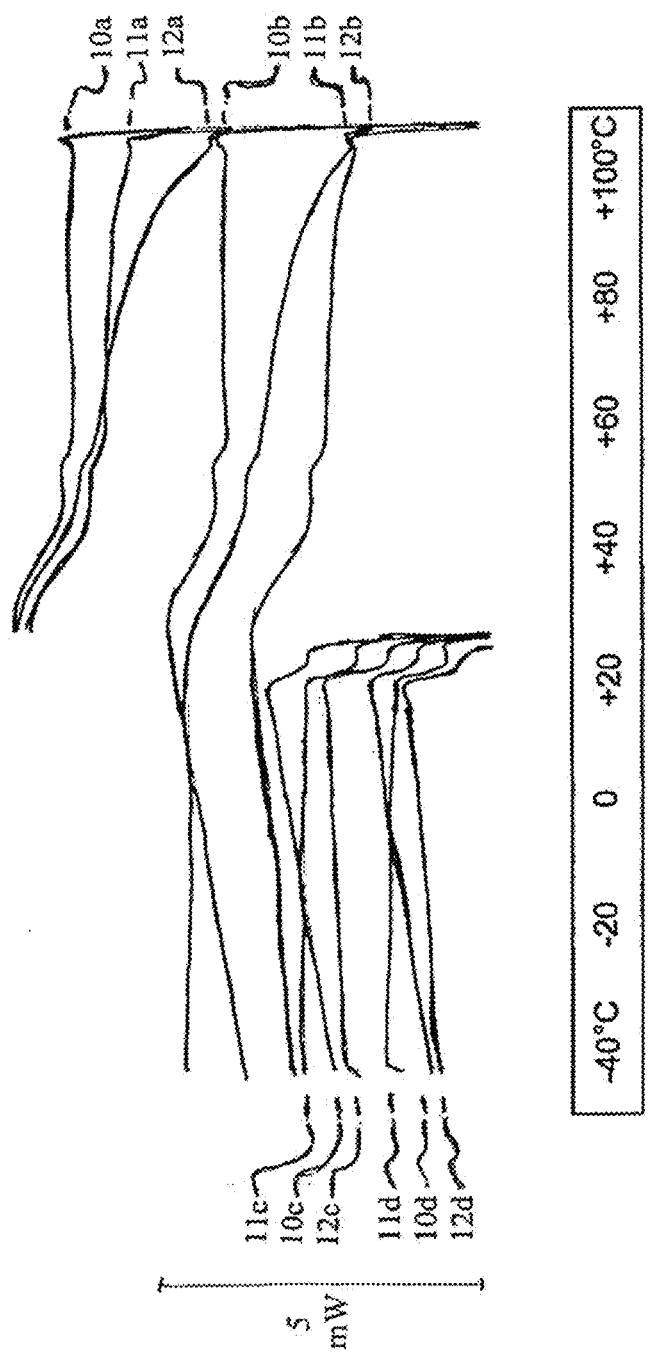
FIG. 6 is the differential scanning calorimetry temperature log of the control bunker sample, the ionized bunker sample 1 and the ionized bunker sample 2.

FIG. 6 shows a DSC temperature log of all three (3) samples showing cooling. Control bunker 10, ionized bunker sample 1 11, and ionized bunker sample 2 12 are shown being cooled at four temperatures. The samples were cooled from 100° C. to 25° C. The results of this cooling is shown as control bunker 10a, ionized bunker sample 1 11a, and ionized bunker sample 2 12a. The samples were also cooled from 100° C. to −40° C. The results of this cooling is shown as control bunker 10b, ionized bunker sample 1 11b, and ionized bunker sample 2 12b. The samples were cooled from 25° C. to −40° C. The results of this cooling is shown as control bunker 10c, ionized bunker sample 1 11c, and ionized bunker sample 2 12c. The samples were heated and cooled again from 25° C. to −40° C. The results of this cooling is shown as control bunker 10d, ionized bunker sample 1 11d, and ionized bunker sample 2 12d.

Figure 7:
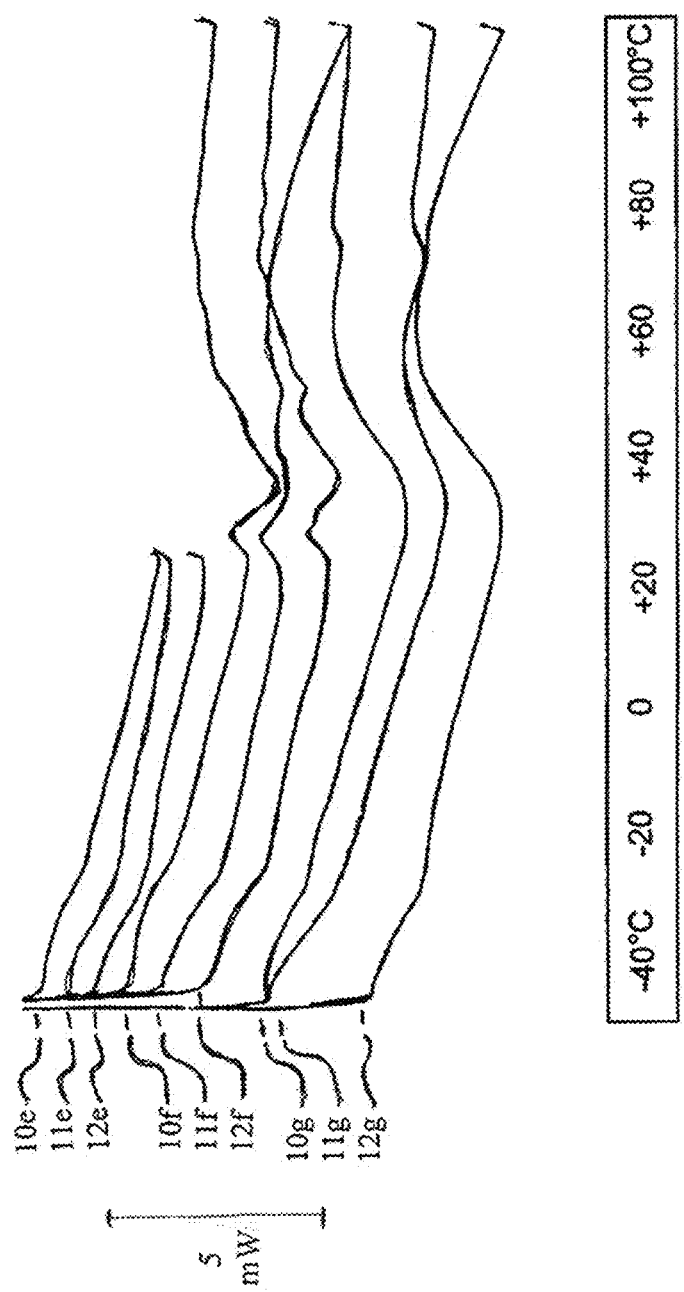
FIG. 7 is part of the differential scanning calorimetry temperature log showing heating for the control bunker sample, the ionized bunker sample 1 and the ionized bunker sample 2.

FIG. 7 shows the DSC temperature log of all three (3) samples showing heating. Control bunker 10, ionized bunker sample 1 11, and ionized bunker sample 2 12 are shown being heated at three temperatures. The samples were heated from −40° C. to 25° C. The results of this heating are shown as control bunker 10e, ionized bunker sample 1 11e, and ionized bunker sample 2 12e. The samples were heated from heating from −40° C. to 100° C. The results of this heating are shown as control bunker 10f, ionized bunker sample 1 11f, and ionized bunker sample 2 12f. The samples were cooled and heated again from −40° C. to 100° C. The results of this heating are shown as control bunker 10g, ionized bunker sample 1 11g, and ionized bunker sample 2 12g. In general, these DSC temperature logs show that the control bunker reflects a higher heat flow than the ionized bunker samples. This is likely due to a higher viscosity and more complex molecular structure in the control bunker sample than in the ionized bunker sample.

Example II

The primary goal of the test was to determine the changes in the bunker oil molecular structure when treated with the core. The method and the resulting treated bunker fuel was tested at INA d. d. Zagreb Croatia in Petroleum Products Quality Control Laboratory. See www.ina.hr.

The primer samples of the bunker oil sludge used in the INA test, were delivered to the petroleum products quality control laboratory of INA. The samples consisted of normal middle bunker oil with additive, the properties of which were demonstrated on GCWGC (two-dimensional gas chromatography). After the bunker oil samples pass through the core in the supply line, the collection process determined that the viscosity of the samples was lower than the viscosity of the control bunker oil (untreated bunker oil), and that is lower than the primer standard.

The purpose of testing was to establish potential differences between untreated bunker oil and bunker oil treated with the core. The test was run on bunker oil samples, which passed through ionizer core and bunker oil samples from a reservoir in Kalinovici. In total, 2 samples of untreated bunker oil were received and 2 samples of treated bunker oil were processed. Two methods were used for testing: (a) SEM method (scanning electron microscope)—which is a microscopic observation of the bunker oil's surface and (b) DSC method (differential scanning calorimetry)—a thermal method which determines the specific heat of the bunker oil. Tables IV to IX show the results of initial testing performed on the samples to show their inherent properties.

TABLE IV

Quality Control for Ionized Bunker Sample

| Features | Units | Cutoff | Result | Method |
|---|---|---|---|---|
| Carbon residue MICROCARBON | — | | | HRN EN ISO 10370 |
| Carbon residue on overall sample | % m/m | <15 | 2.56 | HRN EN ISO 10370 |
| Ash (oxide) - Instrumental method | % m/m | <0.2 | 0.177 | HRN EN ISO 6245 |
| Flash point closed, PM | ° C. | >70 | 124.5 | ASTM D 93:10 (A procedure) |
| Pour point | ° C. | <40 | 36 | HRN ISO 3016:97 |
| Kinematic viscosity at certain temperature | — | | | ASTM D 7042:10 |
| Kinematic viscosity at 100° C. | $mm^2/s$ | 6-26 | 24.58 | ASTM D 7042:10 |
| Sulfur wave-dispersive X-Ray | % m/m | <1 | 0.93 | ASTM D 2622 |

TABLE V

Two Dimensional Gas Chromatography-Quality Control for Ionized Bunker Sample

| Features | Units | Cutoff | Result | Method |
|---|---|---|---|---|
| GCxGC - Comprehensive Two-dimensional gas chromatography (determining group composition in petroleum and middle distillates, diesel fuel and light cyclic oils) | | | | Own method (for GCxGC) |
| Paraffins - total | % m/m | | 47.79 | Own method (for GCxGC) |
| n-paraffins | % m/m | | 16.95 | Own method (for GCxGC) |
| iso-paraffins | % m/m | | 14.01 | Own method (for GCxGC) |
| cyclo-paraffins - naphthenic | % m/m | | 16.83 | Own method (for GCxGC) |
| Paraffins (n-, iso-) | % m/m | | 30.96 | Own method (for GCxGC) |
| Olefins | % m/m | | | Own method (for GCxGC) |
| Arenes - total | % m/m | | 52.21 | Own method (for GCxGC) |
| mono-arenes | % m/m | | 11.74 | Own method (for GCxGC) |
| di-arenes | % m/m | | 30.34 | Own method (for GCxGC) |
| tri-arenes | % m/m | | 10.13 | Own method (for GCxGC) |
| poly-arenes | % m/m | | 40.47 | Own method (for GCxGC) |
| Biphenyls | % m/m | | | Own method (for GCxGC) |

TABLE VI

Quality Control for Ionized Bunker Sample at 100° C. (4 months old)

| Features | Units | Cutoff | Result | Method |
|---|---|---|---|---|
| Carbon residue MICROCARBON | — | | | HRN EN ISO 10370 |
| Carbon residue on overall sample | % m/m | <15 | <0.01 | HRN EN ISO 10370 |
| Ash (oxide) - Instrumental method | % m/m | <0.2 | <0.001 | HRN EN ISO 6245 |
| Flash point closed, PM | ° C. | >70 | 118.5 | ASTM D 93:10 (A procedure) |
| Pour point | ° C. | <40 | 0 | HRN ISO 3016:97 |

TABLE VI-continued

Quality Control for Ionized Bunker Sample at 100° C. (4 months old)

| Features | Units | Cutoff | Result | Method |
|---|---|---|---|---|
| Kinematic viscosity at certain temperature | — | | | ASTM D 7042:10 |
| Kinematic viscosity at 100° C. | mm$^2$/s | 6-26 | 23.51 | ASTM D 7042:10 |
| Sulfur wave-dispersive X-Ray | % m/m | <1 | 0.9 | ASTM D 2622 |

TABLE VII

V-Two Dimensional Gas Chromatography-Quality Control for Ionized Bunker Sample (4 months old)

| Features | Units | Cutoff | Result | Method |
|---|---|---|---|---|
| GCxGC - Comprehensive Two-dimensional gas chromatography (determining group composition in petroleum and middle distillates, diesel fuel and light cyclic oils) | | | | Own method (for GCxGC) |
| Paraffins - total | % m/m | | 48.73 | Own method (for GCxGC) |
| n-paraffins | % m/m | | 21.47 | Own method (for GCxGC) |
| iso-paraffins | % m/m | | 13.78 | Own method (for GCxGC) |
| cyclo-paraffins - naphthenic | % m/m | | 13.48 | Own method (for GCxGC) |
| Paraffins (n-, iso-) | % m/m | | 32.25 | Own method (for GCxGC) |
| Olefins | % m/m | | | Own method (for GCxGC) |
| Arenes - total | % m/m | | 51.27 | Own method (for GCxGC) |
| mono-arenes | % m/m | | 12.34 | Own method (for GCxGC) |
| di-arenes | % m/m | | 28.83 | Own method (for GCxGC) |
| tri-arenes | % m/m | | 10.1 | Own method (for GCxGC) |
| poly-arenes | % m/m | | 38.93 | Own method (for GCxGC) |
| Biphenyls | % m/m | | | Own method (for GCxGC) |

TABLE VIII

Quality Control for Ionized Bunker Sample at 110° C. (4 months old)

| Features | Units | Cutoff | Result | Method |
|---|---|---|---|---|
| Carbon residue MICROCARBON | — | | | HRN EN ISO 10370 |
| Carbon residue on overall sample | % m/m | <15 | <0.01 | HRN EN ISO 10370 |
| Ash (oxide) - Instrumental method | % m/m | <0.2 | <0.001 | HRN EN ISO 6245 |
| Flash point closed, PM | ° C. | >70 | 116.5 | ASTM D 93:10 (A procedure) |
| Pour point | ° C. | <40 | 6 | HRN ISO 3016:97 |
| Kinematic viscosity at certain temperature | — | | | ASTM D 7042:10 |
| Kinematic viscosity at 100° C. | mm$^2$/s | 6-26 | 23.48 | ASTM D 7042:10 |
| Sulfur wave-dispersive X-Ray | % m/m | <1 | 0.9 | ASTM D 2622 |

TABLE IX

Quality Control for Ionized Bunker Sample at 110° C. (4 months old)

| Features | Units | Cutoff | Result | Method |
|---|---|---|---|---|
| Carbon residue MICROCARBON | — | | | HRN EN ISO 10370 |
| Carbon residue on overall sample | % m/m | <15 | <0.01 | HRN EN ISO 10370 |
| Ash (oxide) - Instrumental method | % m/m | <0.2 | <0.001 | HRN EN ISO 6245 |
| Flash point closed, PM | ° C. | >70 | 116.5 | ASTM D 93:10 (A procedure) |
| Pour point | ° C. | <40 | 3 | HRN ISO 3016:97 |

TABLE IX-continued

Quality Control for Ionized Bunker Sample at 110° C. (4 months old)

| Features | Units | Cutoff | Result | Method |
|---|---|---|---|---|
| Kinematic viscosity at certain temperature | — | | | ASTM D 7042:10 |
| Kinematic viscosity at 100° C. | mm$^2$/s | 6-26 | 23.17 | ASTM D 7042:10 |
| Sulfur wave-dispersive X-Ray | % m/m | <1 | 0.9 | ASTM D 2622 |

Scanning Electron Microscope—SEM Testing

For the purpose of SEM testing, a microscope JEOL 5800 was used, equipped with corresponding detectors. One of the important conditions for this SEM test is that sample needs to be stable in a high vacuum. To ensure the stability, a drop of fuel oil was placed on a glass and smeared, to get as thin and as homogeneous smear as possible. The smear was dried and gold plated to ensure good electrical transmittance and therefore better image. Cavities or holes were spotted, smaller and bigger. For the fuel samples that had passed through ionizer core, the number of those cavities or holes was significantly greater. Particles' sizes were between 10-30 μm. Particles were not usually spotted with fuel oil treated with the ionizer core, but only cavities of different size and shapes.

DSC Testing

This testing was conducted with Perkin Elmer DSC-7 calorimeter. Testing was done within temperature range of 30° C.-150° C., recording speed of 10° C./min in oxygen current. Small amounts of sample weighing a few milligrams were measured.

Figure 8:
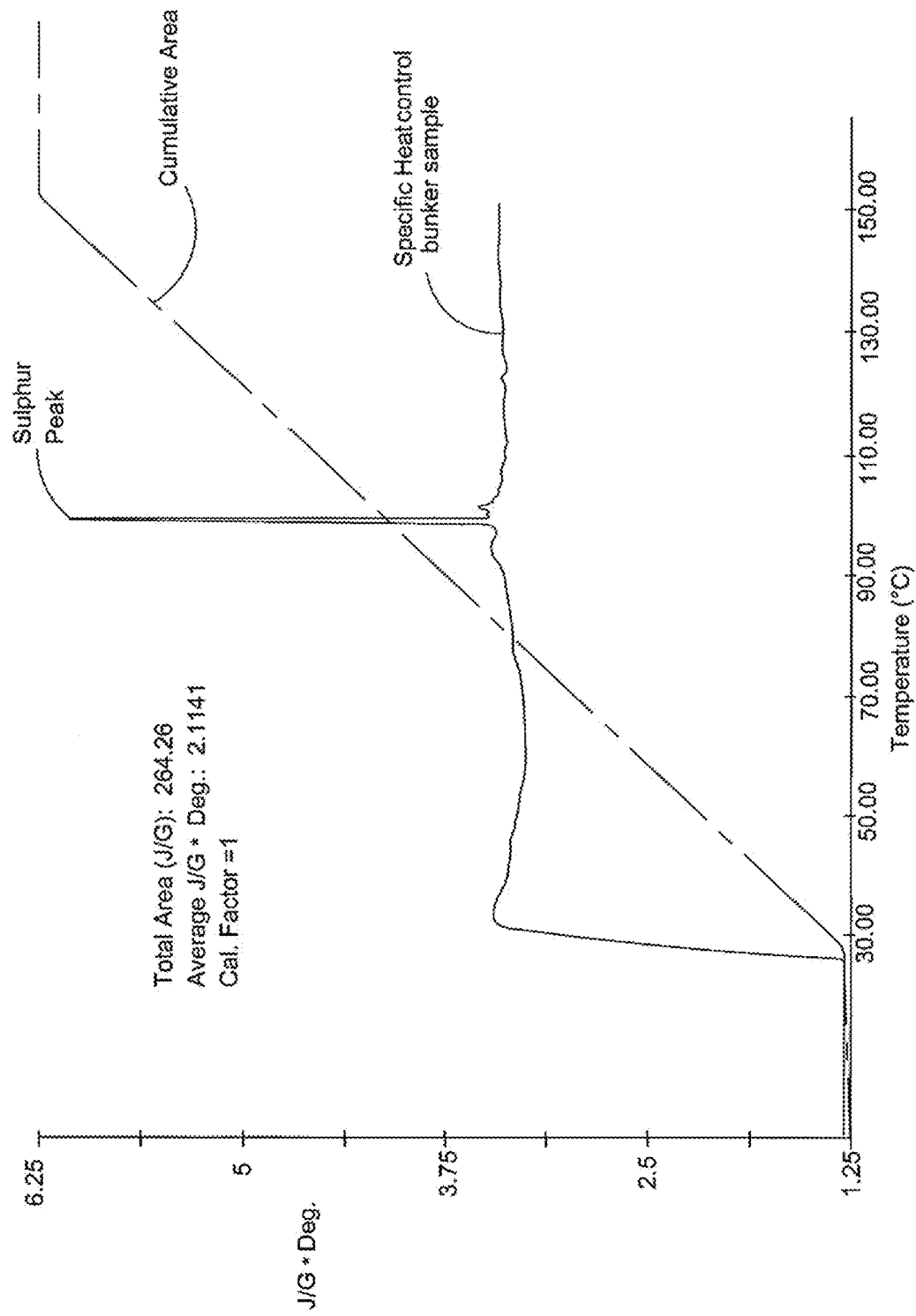
FIG. 8 is an endothermic graph of the control bunker sample on day 1.

FIG. 8 is the endothermic graph of the control bunker sample from day 1. The specific heat was 2.1141 and there was a prominent endothermic sulfur peak at approximately 110° C. In each of the graphs, the cumulative area is shown by a dashed line. This represents the average value of the fuel power. The specific heat line represents the combination of the power and temperature given by fuel while the fuel is being burned. FIG. 9 is the endothermic graph of the ionized bunker sample from day 1. The specific heat was 2.308 and there was an absence of a sulfur peak. FIG. 10 is the endothermic graph of the control bunker sample from day 2. The specific heat was 1.9634 and there was a prominent endothermic sulfur peak at approximately 110° C. FIG. 11 is the endothermic graph of the ionized bunker sample from day 2. The specific heat was 2.0679 and again, there was an absence of a sulfur peak.

TABLE X

Specific Heat Results

| | Bunker Oil J/g * Deg | Treated Bunker Oil J/g * Deg |
|---|---|---|
| First Day | 2.1141 | 2.3080 |
| Second Day | 1.9634 | 2.0679 |
| | 2.0902 | 2.0858 |
| Average Value | 2.0559 | 2.1539 |

The occurrence of endothermic peak in bunker oil at temperature of approximately 110° C. is very significant. This is the sulfur peak. In bunker oil treated with the core ionizer, such peaks did not occur. Accordingly, the sulfur was removed from the treated bunker oil.

In conclusion, the tests have shown that certain significant difference exists between untreated bunker oil and bunker oil treated with ionizer core. Namely, the viscosity of the treated bunker oil was lowered such that the bunker oil maintained a liquid state without heat. Moreover, the treated samples had a significant reduction in the content of sulfur contaminants. The tests confirmed that exposure of bunker liquid to the core changed the bunker oil liquid point from 30° C. to 0° C. The volatility or flash point decreased from 124.5° C. to 116.5° C.

In earlier tests, primer test samples were bunker sludge which consisted of normal middle fuel oil with additive analyzed by GCWGC (comprehensive two-dimensional gas chromatography). After the first exposure of the primer test samples to the ionization core (resulting in treated bunker oil), the process determined that the sample's viscosity was more liquefied than primer standard (the control sample). Based on previous experience on exposing bunker oil to the ionization core which creates catalytic reactions, it was concluded that the reaction causes molecular separation with an electric charge. Because of molecular separation and the electric charge, mass changes and the reflection or repulsion of the particles with the same charge leads to changes in the physical performance like liquefaction and lower viscosity.

Earlier studies showed that there were lower concentrations of $SO_2$ in the flue gases when the treated bunker was burned. When these samples were looked at through an electronic microscope, it was determined that sulfuric compounds had changed their crystal structure. Apparently, the sulfuric compounds changed in crystal structure and this change in activity caused merger with other metals present in the fuel oil. In this manner, the metal sulfides and fall down to the bottom of combustion plant or they exit in the form of flue gas particles.

As the fuel or bunker oil passes over the core, electrostatically charged molecules in the bunker oil with the same polarity repulse each other thus creates a finer structure in the molecular bunker oil chain. This finer structure and permits the treated fuel to be transported to the consumer, or pumped into a transport vessel or truck. The ionization core can be mounted on a heavy fuel burner to maintain viscosity temperature, at the exit of the fuel heater and burner nozzle assembly adjustment are made to air and fuel intakes respectively. In the case of a internal combustion engine, mounting the device rack is done in front of the high-pressure pump.

Exposing the fuel oil or bunker oil to the ionizing core creates a magnetic catalytic reaction in the fuel. As a reaction to the electric charge, a molecular separation occurs in the molecular chain of the fuel. Due to molecular separation, the mass of certain particles changes, and the repulsion (deflection) of particles having the same charge leads to changes in the physical structure and performance of the molecular fuel chain, like liquefaction.

Also, the treatment of the bunker fuel by the ionizing core causes a change in the sulfuric compounds. This change occurs during the catalytic reactions such that the crystal structure of sulfur changes and their activity is altered and some sulfur is merged with potentially present metals in the bunker fuel oil. This result creates metal sulfides that are "free radicals" that fall down to the bottom of combustion plant, get removed via hydration or they exit in the form of flue gas particles.

In this manner, the treatment of bunker fuel with the ionizing core at a supply line becomes a solution for dramatically reducing S02 sulfur content in flue gases. As a result, the treated fuel exceeds environmental criteria mandated for this type of residual fuel.

The claims appended hereto are meant to cover modifications and changes within the scope and spirit of the present invention.

What is claimed is:

1. A method for reducing sulfur contaminants and lowering viscosity in bunker oil comprising:
   passing bunker oil over a core that ionizes the bunker oil with an electrostatic charge;
   wherein the core consists of a metal bar being made of an alloy comprising, by weight, 40-70% copper, 10-32% nickel, 15-40% zinc, 2-20% tin and 0.05-10% silver;
   wherein the core is within a casing having an inlet and an outlet at its ends for receiving and discharging the bunker oil to be treated; and
   wherein the core is placed on a bunker oil supply line.

2. The method of claim 1, wherein the metal bar of the core comprises a plurality of cuts having a concave shape and arranged diagonally along an entire surface of an upper and a lower face of the metal bar of the core to create grooves, which allows the bunker oil to be agitated as it comes in contact with the core, activating the electrostatic charge.

3. The method of claim 2, wherein the electrostatic charge creates a magnetic catalytic reaction that causes a molecular separation in molecular chains within the bunker oil thereby lowering the viscosity of the bunker oil.

4. The method of claim 3, wherein the bunker oil maintains a lower viscosity for up to a year.

5. The method of claim 3, wherein the bunker oil maintains a lower viscosity at temperatures above 0° C. such that the bunker oil remains in a liquid state.

6. The method of claim 3, wherein the bunker oil maintains a liquid state at temperatures in the range of 100° C. to 0° C.

7. The method of claim 2, wherein the electrostatic charge creates a magnetic catalytic reaction that causes sulfur to merge with metals and create metal sulfides in the bunker oil thereby reducing the sulfur contaminants in the bunker oil.

8. The method of claim 1, wherein the core is placed on a fuel supply line at a production site of the bunker oil.

9. The method of claim 1, wherein the bunker oil maintains a reduced sulfur content for up to a year.

10. A method for reducing sulfur contaminants in bunker oil comprising:
    passing bunker oil over a core that ionizes the bunker oil with an electrostatic charge;
    wherein the core consists of a metal bar being made of an alloy comprising, by weight, 40-70% copper, 10-32% nickel, 15-40% zinc, 2-20% tin and 0.05-10% silver;

wherein the metal bar of the core comprises a plurality of cuts having a concave shape and arranged diagonally along an entire surface of an upper and a lower face of the metal bar of the core to create grooves, which allows the bunker oil to be agitated as it comes in contact with the core, activating the electrostatic charge;

wherein the core is within a casing having an inlet and an outlet at its ends for receiving and discharging the bunker oil to be treated; and wherein the bunker oil has reduced sulfur contaminants.

11. The method of claim 10, wherein the electrostatic charge creates a magnetic catalytic reaction that causes sulfur contaminants to merge with metals and create metal sulfides in the bunker oil thereby reducing the sulfur in the bunker oil.

12. A method for maintaining bunker oil in a liquid state comprising:

passing bunker oil over a core that ionizes the bunker oil with an electrostatic charge;

wherein the core consists of a metal bar being made of an alloy comprising, by weight, 40-70% copper, 10-32% nickel, 15-40% zinc, 2-20% tin and 0.05-10% silver;

wherein the metal bar of the core comprises a plurality of cuts having a concave shape and arranged diagonally along an entire surface of an upper and a lower face of the metal bar of the core to create grooves, which allows the bunker oil to be agitated as it comes in contact with the core, activating the electrostatic charge;

wherein the core is within a casing having an inlet and an outlet at its ends for receiving and discharging the bunker oil to be treated; and wherein the bunker oil is maintained in a liquid state.

13. The method of claim 12, wherein the electrostatic charge creates a magnetic catalytic reaction that causes a molecular separation in molecular chains within the bunker oil thereby lowering the viscosity of the bunker oil.

14. The method of claim 12, wherein the bunker oil maintains its liquid state at temperatures above 0° C.

15. The method of claim 12, wherein the bunker oil maintains a liquid state at temperatures in the range of 100° C. to 0° C.

* * * * *